L. D. POWELL.
COMBINED VEHICLE AND HOBBY HORSE.
APPLICATION FILED AUG. 24, 1916.
1,226,590.
Patented May 15, 1917.
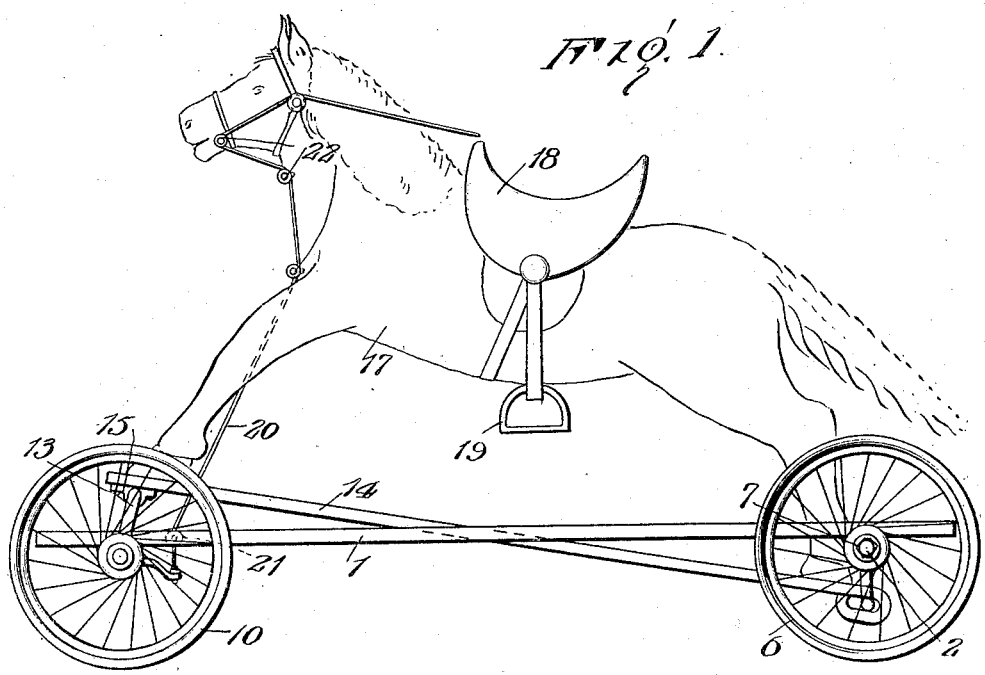
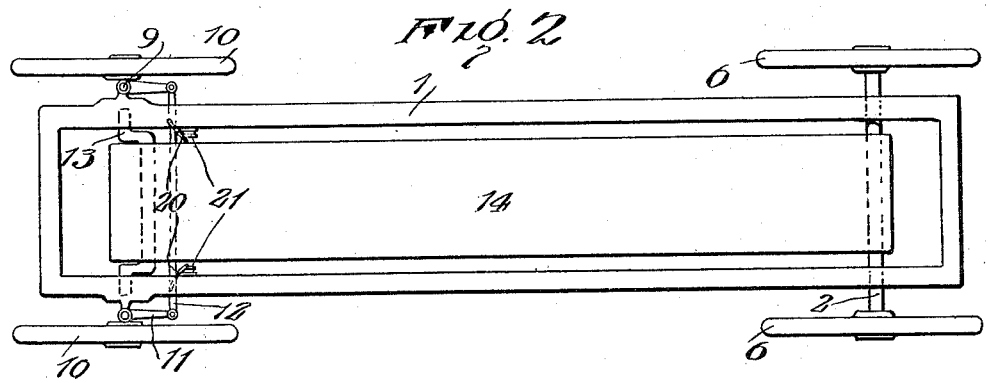
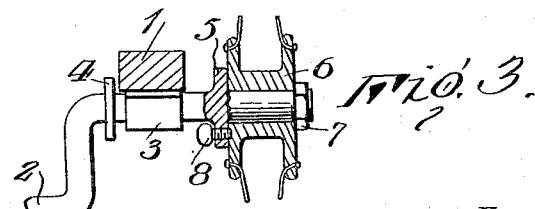
Lura D. Powell,
Inventor
By Geo. P. Kimmel.
Attorney

UNITED STATES PATENT OFFICE.

LURA D. POWELL, OF SWAMPSCOTT, MASSACHUSETTS.

COMBINED VEHICLE AND HOBBY-HORSE.

1,226,590. Specification of Letters Patent. Patented May 15, 1917.

Application filed August 24, 1916. Serial No. 116,658.

*To all whom it may concern:*

Be it known that I, LURA D. POWELL, a citizen of the United States, and resident of Swampscott, in the county of Essex and State of Massachusetts, have invented certain new and useful Improvements in Combined Vehicles and Hobby-Horses, of which the following is a specification.

This invention has reference generally, to improvements in toys, and more particularly, relates to a combined coaster and hobby-horse.

As the primary aim and object, the present invention contemplates the provision of a novel device of the character mentioned that can be readily converted from a vehicle to a hobby-horse and vice versa, a simple yet novel arrangement being provided for preventing the transmission of motion to the wheels when desired.

It is an equally important object of the invention to mount a figure of an animal, preferably a horse, on the frame, in such a manner that when a rocking movement is imparted thereto, the horse will appear to gallop, and at the same time the rear axle which is in connection therewith will be rotated so as to consequently propel the device.

The invention also embraces the provision of efficient means arranged within easy reach of the rider for guiding the frame during rocking movement of the horse.

Still further, the invention contemplates the provision of means for removably fastening the wheels to the rear axle so that when desired the frame can be maintained in a stationary position, the wheels serving to rotatably support the rear axle allowing the device to be used in the capacity of a hobby-horse.

Among the other aims and objects of the invention may be recited the provision of a device of the character described with a view to compactness, the number of parts of which are few, the construction simple, the cost of production low and the efficiency high.

Other improvements and novel details in the construction and arrangement of the various parts of the device will be brought out more in detail in the description to follow, which, for a clear understanding of the invention, should be considered in connection with the accompanying drawings, forming a part hereof, and wherein is disclosed, for the purpose of illustration, a convenient and satisfactory embodiment of the invention. It is to be noted, in this connection, that minor changes in the construction and arrangement of the parts may be made without departing from the spirit of the invention or the principle of operation of the various parts.

Similar characters of reference are employed in all of the above described views, to indicate corresponding parts.

Figure 1 is a side elevation of my invention.

Fig. 2 is a top plan view thereof with the figure removed.

Fig. 3 is an enlarged detail.

Referring now, more particularly, to the accompanying drawings I provide a frame or chassis 1, adjacent the rear end of which is journaled the respective ends of a transversely extending crank or axle shaft 2, by means of suitable bearings 3, the cranked portion being arranged between the sides of the frame. Bearing collars 4 are integral with the axle for preventing the transverse movement thereof. Other collars 5 are also integral with the projecting ends of the axle and serve as bearings for ground wheels 6 rotatably mounted on the axles and removably held thereon by suitable means such as nuts 7. Set screws 8 are adjustably mounted in the collars 5, the inner ends being adapted to engage the wheel hubs 6 when desired to rigidly clamp the wheels to the axle so that the wheels will rotate with the axle. On the sides of the frame adjacent the front end I have pivoted front axles 9 of a conventional form, while ground wheels 10 are rotatably mounted thereon for rotatably supporting the front end of the frame.

Downwardly inclined arms 11 extend at right angles from the inner ends of the axles 9 and are pivotally connected by means of a connecting rod 12 for a purpose that will presently appear. A crank shaft 13 has the respective ends thereof journaled in the sides of the frame adjacent the front end thereof, the cranked portion being arranged between the sides of the frame for a purpose to be described.

In order to propel the frame I have provided an elongated supporting member 14, the front end of which is pivoted to the cranked portion of the shaft 13 by means of a bearing 15 while the opposite end may be and preferably is rolled upon itself as indicated by the numeral 16, to assist in imparting the natural galloping movement to the figure 17 and to permit a slight movement of the supporting member to start the vehicle in motion, to provide an elongated loop or slot in which is arranged the cranked portion of the rear axle 2. It is to be noted in this connection that when the cranked portion of the shaft 13 is in a raised position the cranked portion of the rear axle is in its lowermost position, as illustrated in Fig. 1 so that when a rocking movement is imparted to the supporting member 14, the crank shaft 13 and the rear axle 2 will be rotated.

A figure of an animal which may be and preferably is a horse 17, has the legs thereof rigidly connected to the front and rear ends of the supporting member 14. A saddle 18 is arranged on the back of the horse for the convenience of the driver, as are stirrups 19 which depend from the saddle. The driver by leaning forward and backward will impart a rocking movement to the supporting member so as to consequently rotate the rear wheels when the latter are rigidly connected to the rear axle and thus propel the device.

For the purpose of guiding the device during movement I have provided my improved flexible means preferably a cable 20 the respective ends of which are rigidly connected adjacent the outer ends of the connecting rod 12 while the side portions are trained about idlers 21, rotatably mounted in the sides of the frame and other idlers 22 rotatably mounted on both sides of the horse's neck and mouth so that the cable will resemble a bridle and be arranged within easy reach of the occupant of the saddle 18. It will be apparent that by exerting a pull on either portion of the cable the front wheels turn in the corresponding direction.

The mode of operation of the invention may be reviewed as follows:—

When the occupant of the device leans forward, the forward end of the supporting member 14 will move downwardly and will push the cranked portion of the rear axle upwardly so as to consequently rotate the rear wheels 6, assuming, of course, that the rear wheels 6 are rigidly connected thereto and thus propel the frame forwardly continuously during the rocking movement imparted to the horse by the occupant. The front wheels 10 can be guided by exerting a pull on either side of the cable 21 and inasmuch as this cable resembles a bridle the rocking movement which is imparted to the horse causes the latter to imitate a galloping movement of a horse. If desired a suitable block or the like may be arranged between the rear wheels 6 and the set screws loosened so that the rear axle may rotate and allow the device to be used as a rocking or hobby-horse.

As many changes could be made in the above construction and many apparently widely and different embodiments of this invention could be made without departing from the scope thereof, and it is intended that all matters contained in the above description or shown in the accompanying drawings shall be interpreted as illustrative and not in a limiting sense. It is also to be understood that the language used in the following claims is intended to cover all of the generic and specific features of the invention herein described and all statements of the scope of the invention, which, as a matter of language, might be said to fall therebetween.

Having thus described my invention, what I claim as new and desire to secure by Letters Patent, is:

1. A device of the character described including a frame, a figure arranged to rock on the frame, a cranked rear axle for supporting one end of the figure and rotated by the figure, a crank shaft journaled in front of the said frame, and supporting member pivoted to the crank shaft, wheels for supporting the front end of the frame, other wheels arranged on the rear axle, and means for releasably clamping the wheels on the rear axle.

2. A device of the character described including a frame, a cranked rear axle journaled therein, front axles pivotally mounted thereon, supporting wheels, crank shaft journaled in the front of said frame, a supporting member pivoted to the crank shaft, a figure mounted on the supporting member to enable a rocking movement being imparted thereto, a loose connection formed on the said supporting member for engagement with the cranked rear axle to provide means to assist in starting the vehicle, and means for releasably clamping the wheels on the rear axle.

In testimony whereof, I affix my signature hereto.

MRS. LURA D. POWELL.

Copies of this patent may be obtained for five cents each, by addressing the "Commissioner of Patents, Washington, D. C."